United States Patent [19]

Kisil et al.

[11] Patent Number: 4,525,293

[45] Date of Patent: Jun. 25, 1985

[54] COMPOSITION FOR PREVENTING DEPOSITION OF INORGANIC SALTS

[76] Inventors: Evgeny D. Kisil, bulvar Engelsa, 10, kv. 168; Svetlana N. Komova, ulitsa Odeevskogo, 68a, kv. 61; Olga A. Kulikova, ulitsa imeni Generala Shulimova 16. kv. 47; Leonid I. Kutyanin, ulitsa Zoi Maresevoi, 15, kv. 21; Larisa V. Popova, ulitsa Kirova, 151, kv. 60, all of Volgograd; Nina M. Dyatlova, 2-0i Samotechny pereulok, 4, korpus 1, kv. 4, Moscow; Rostislav P. Lastovsky, ulitsa Gotvalda, 20, kv. 24, Moscow; Galina F. Yaroshenko, ulitsa Udaltsova, 14, kv. 120, Moscow; Rem A. Khramov, B. Khmelnitskogo, 3, kv. 4, Orenburg; Leonid T. Dytjuk, ulitsa Narodnaya, 13, kv. 51, Orenburg; Rafail K. Samakaev, ulitsa Chkalova, 28, kv. 70, Orenburg; Anatoly N. Vasnev, Borisovsky proezd, 36, korpus 2, kv. 367, Moscow, all of U.S.S.R.

[21] Appl. No.: 538,561

[22] Filed: Oct. 3, 1983

[51] Int. Cl.$^3$ ............................ C02F 5/12; C02F 5/14
[52] U.S. Cl. .................................. 252/181; 166/279; 210/699; 210/700
[58] Field of Search ....................... 252/181; 166/279; 210/699, 700

[56] References Cited

U.S. PATENT DOCUMENTS

| | | | |
|---|---|---|---|
| 3,432,553 | 3/1969 | Enders et al. | 260/585 |
| 3,440,170 | 4/1969 | de Hek | 252/81 |
| 3,467,192 | 9/1969 | Nolan et al. | 166/279 |
| 3,483,925 | 12/1969 | Slyker | 166/279 |
| 3,778,377 | 12/1973 | Clark | 252/181 |
| 4,051,110 | 9/1977 | Quinlan | 210/700 |

FOREIGN PATENT DOCUMENTS

| | | |
|---|---|---|
| 469771 | 8/1975 | U.S.S.R. |
| 789434 | 12/1980 | U.S.S.R. |
| 834334 | 6/1981 | U.S.S.R. |
| 876666 | 10/1981 | U.S.S.R. |

Primary Examiner—Paul Lieberman
Assistant Examiner—Robert A. Wax
Attorney, Agent, or Firm—Ladas & Parry

[57] ABSTRACT

The present invention relates to a composition for preventing deposition of inorganic salts. It comprises 5.0–50.0% by weight of a phosphonomethylated derivative of 1,3-diaminopropanol-2 of the general formula:

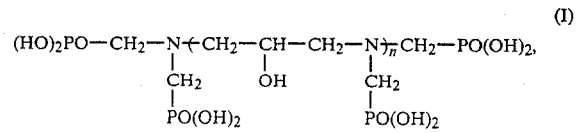

wherein n=1 to 20; 5.0 to 10.0% by weight of 1,3-diaminopropanol-2 and/or a derivative of 1,3-diaminopropanol-2 of the general formula:

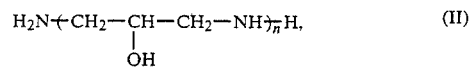

wherein n=1 to 20; 3.0–30.0% by weight of hydrochloric acid, 3.0–7.0% by weight of an alkali metal chloride, 0.5–2.5% by weight of a product of interaction of benzyl chloride, chlorobenzyl chloride, benzylidene chloride or a mixture of these chlorinated compounds with hexamethylenetetramine at a molar ratio thereof equal to 1:0.25–0.45 respectively; 0.5–4.0% by weight of a water-soluble organic solvent and water being the balance. The protective effect of the composition against deposition of inorganic salts is as high as 100%. The freezing point is as low as −100° C., thus enabling the use of the composition under arctic climate conditions without the necessity of adding costly antifreeze agents.

1 Claim, No Drawings

COMPOSITION FOR PREVENTING DEPOSITION OF INORGANIC SALTS

FIELD OF THE INVENTION

The present invention relates to compositions for preventing deposition of inorganic salts from aqueous solutions on metal surfaces and can be useful in the systems of return water supply, distillers for mineralized waters, in processes of oil and natural gas extraction, transportation and preconditioning.

BACKGROUND OF THE INVENTION

Known in the art are compositions for preventing deposition of inorganic salts comprising aminomethylenephosphonic compounds and surfactant additives. Thus, U.S. Pat. No. 3,467,192 Cl. 166-279 (1968) teaches the use, as the aminomethylenephosphonic compound, of nitrilotrimethylenephosphonic acid of the formula:

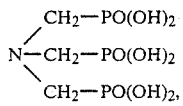

and as the surfactant—a compound of the formula:

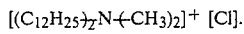

Also known in the art is a composition for preventing deposition of inorganic salts comprising polyethylenepolyamine-N-methylenephosphonic acid of the general formula:

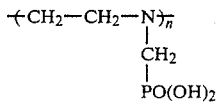

wherein n=1 to 14 and polyacrylamide (cf. U.S. Pat. No. 3,483,925 Cl. 166-279, 1968).

Furthermore, also known in the art is a process for preventing deposition of inorganic salts with the use of an aminomethylenephosphonic acid for the general formula:

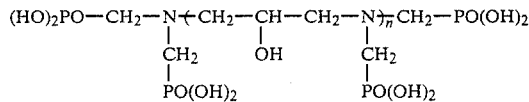

wherein n=1 to 5, (cf. USSR Inventor's Certificate No. 789434, Int. Cl.$^3$ CO2 F 5/14, E 21 B 43/12, 1980).

However, the above-discussed processes provide but an insufficient protective effect against deposition of inorganic salts. Furthermore, the use of polyacrylamide in the above-described compositions involves considerable difficulties in the preparation of working solutions of this particular compound from a gel-like commercial product. The manufacture of an aqueous solution of polyacrylamide requires a special equipment which inevitably causes inefficient labour- and power expenditures.

The closest prior art composition most resembling that of the present invention in the subject matter and the effect obtained is a composition for preventing deposition of inorganic salts comprising a phosphonomethylated derivative of 1,3-diaminopropanol-2 of the general formula:

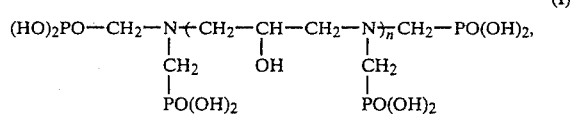

wherein n=1 to 5, and also 1,3-diaminopropanol-2 and/or a derivative of 1,3-diaminopropanol-2 of the general formula:

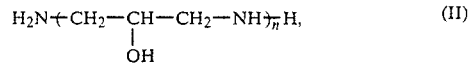

wherein n=2 to 5, hydrochloric acid, sodium chloride and water, the components being present in the following proportions, percent by weight:

| | |
|---|---|
| phosphonomethylated derivative of 1,3-diaminopropanol-2 of the general formula (I) | 5.0–20.0 |
| 1,3-diaminopropanol-2 and/or a derivative of 1,3-diaminopropanol-2 of the general formula (II) | 3.0–7.0 |
| hydrochloric acid | 3.0–30.0 |
| sodium chloride | 3.0–7.0 |
| water | to 100 |
| (cf. USSR Inventor's Certificate No. 834334, Int. Cl.$^3$ E 21 B 43/00, 1981). | |

However, this composition possesses but an insufficient protective effect against deposition of inorganic salts and is difficult to handle under winter-weather conditions, since the minimum freezing temperature of the composition is −35° C. The latter condition to a considerable extent restricts the possibility for using this composition in regions with arctic climate, or requires the use of costly antifreeze components.

SUMMARY OF THE INVENTION

It is an object of the present invention to provide such a composition for preventing deposition of inorganic salts which would possess an improved protective effect.

It is another object of the present invention to provide such a composition for preventing deposition of inorganic salts which would have a lower freezing temperature.

These and other objects of the present invention are accomplished by the provision of a composition for preventing deposition of inorganic salts comprising a phosphonomethylated derivative of 1,3-diaminopropanol-2 of the general formula:

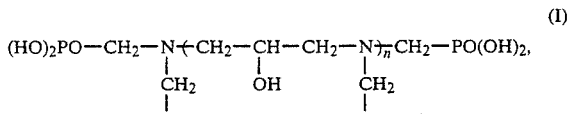

wherein n=1 to 20 and also 1,3-diaminopropanol-2 and/or a 1,3-diaminopropanol-2 derivative of the general formula:

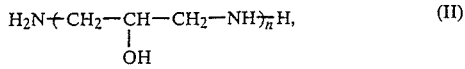

wherein n=2 to 20, hydrochloric acid, an alkali metal chloride and water; the composition according to the present invention additionally contains a product of interaction of benzyl chloride, chlorobenzylchloride or benzylidenechloride or a mixture of these chlorinated compounds with hexamethylenetetramine in a molar ratio thereof of 1:0.25–0.45 respectively and a water-soluble organic solvent, the components being present in the following proportions, percent by weight:

| | |
|---|---|
| phosphonomethylated derivative of 1,3-diaminopropanol-2 of the general formula (I) | 5.0–50.0 |
| 1,3-diaminopropanol-2 and/or a 1,3-diaminopropanol-2 derivative of the general formula (II) | 5.0–10.0 |
| hydrochloric acid | 3.0–30.0 |
| alkali metal chloride | 3.0–7.0 |
| product of interaction of benzyl chloride, benzylidene chloride or chlorobenzyl chloride or a mixture of these chlorinated compounds with hexamethylenetetramine | 0.5–2.5 |
| water-soluble organic solvent | 0.5–4.0 |
| water | the balance. |

It is preferable to use, as the water-soluble organic solvent, diacetone alcohol, methanol, ethanol, methylethylketone, dimethylformamide, triethylamine.

Owing to the introduction of the product of interaction of hexamethylenetetramine with the above-mentioned benzylhalides, the composition according to the present invention makes it possible to considerably improve the protective effect against deposition of inorganic salts in aqueous systems as compared to the prior art compositions.

Thus, at the low limit of concentrations of the components of a known composition according to the USSR Inventor's Certificate No. 834334, the protective effect against deposition of calcium sulphate is only 46.6%, whereas that of the composition according to the present invention is as high as 63.8%.

A similar result is obtained at the upper limit of concentrations of the components of both compositions. Thus, for the USSR Inventor's Certificate referred to, the protective effect is 86.5%, whereas for the present invention it is 99.6%.

The composition according to the present invention has a freezing point as low as −100° C. which enables the use of the composition under arctic climate conditions without introducing any costly antifreeze agents.

The reduction of the lower limit of concentrations of the components of the composition according to the present invention is inexpedient, since this results in a lowered protective effect and the composition gets deprived of the advantages over the prior art ones.

Increasing the upper limit of concentrations of the components of the composition according to the present invention is also inexpedient, since already at the above-specified concentrations of the components the protective effect is equal to 100%.

DETAILED DESCRIPTION OF THE INVENTION

The composition for preventing deposition of inorganic salts according to the present invention is prepared by a conventional method through dissolution of the starting components in an aqueous solution of hydrochloric acid.

The component employed in the composition according to the present invention, namely phosphonomethylated derivative of 1,3-diaminopropanol-2 of the general formula (I) is prepared by modifying 1,3-diaminopropanol-2 and/or a derivative of 1,3-diaminopropanol-2 of the general formula (II) with formaldehyde and phosphorus trichloride at the temperature of 45° C., followed by precipitation of the desired product from the reaction mass by methanol.

The product is a white crystalline compound well-soluble in water, insoluble in alcohols, acetone; it possesses properties of a strong acid.

The procedure for the preparation of the phosphonomethylated derivative of 1,3-diaminopropanol-2 is described in the USSR Inventor's Certificate No. 876666, Int. Cl.³ C 08 G 79/04, C 08 J 5/20.

The components of the composition according to the present invention, i.e. 1,3-diaminopropanol-2 and/or a derivative of 1,3-diaminopropanol-2 of the general formula (II) is prepared by reacting epichlorohydrin with a substantial excess of ammonia taken in the form of an aqueous solution, followed by heating of the reaction mass at a temperature of from 10° to 30° C. for a period of from ¼ to 6 hours, neutralization of the formed hydrochloric acid with an alkali metal hydroxide, such as sodium hydroxide, and distilling-off the excess of the aqueous solution of ammonia.

The method for the preparation of 1,3-diaminopropanol-2 and/or the 1,3-diaminopropanol-2 derivative of the general formula II is disclosed in U.S. Pat. No. 4,432,553 Cl. 260–585.

The product additionally contained in the composition according to the present invention is prepared by reacting benzyl chloride, chlorobenzyl chloride or benzylidene chloride or a mixture of these chlorinated compounds with hexamethylenetetramine in the presence of a caustic alkali at a molar ratio therebetween of 1:0.25–0.45:2.2–3.6 respectively and at a temperature within the range of from 100° to 125° C.

The product comprises a transparent yellow-brown liquid.

The procedure for the preparation of a product of interaction of hexamethylenetetramine with the above-specified benzylhalides is described in USSR Inventor's Certificate No. 469771, Int. Cl.² C 23 F 11/10.

The composition according to the present invention can be useful in systems of return water supply, distillers for mineralized waters, as well as in processes of oil and natural gas extraction, transportation and preconditioning.

For example, in exploitation of petroleum fields some embodiments are possible for the introduction of the composition according to the present invention (scaling inhibitor) into the production wells;

1. Continuous dispensing of the composition into the annular space of the oil well by means of a metering device.

2. Continuous dispensing of the composition into the system of maintaining the formation pressure through the pumping well.

3. Periodic pumping of the composition into the productive layer through the exploitation well. This mode of using the composition for preventing deposition of inorganic salts is based on the ability of the composition to get adsorbed on the porous surface of the critical zone of the well and to be slowly washed by mineralized waters during exploitation of the well by known methods, thus inhibiting deposition of inorganic salts in the well and well equipment for a period of several months.

4. Continuous dispensing of the composition by means of a metering device to the inlet of a heat-exchanging equipment of the unit for a thermochemical field preconditioning of crude oil.

The assessment of the protective effect of the composition according to the present invention and the composition according to the USSR Inventor's Certificate No. 834334 against deposition of calcium sulphate is effected according to the following procedure.

Oversaturated calcium sulphate solutions are prepared by mixing equivalent amounts of sodium sulphate and calcium chloride. The reaction occurs according to the scheme:

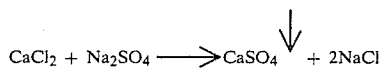

The initial concentration of calcium sulphate in the oversaturated solution is 10 g/l.

In all series of experiments the amount of the composition added to the oversaturated solution of calcium sulphate was 20.0 mg/l, whereas only proportions of the composition components were changed. The solutions were thermostatted at the temperature of 25° C. The protective effect against deposition of calcium sulphate was determined 240 hours afterwards by sampling and analysis of the sample for calcium ions. The protective effect was calculated according to the formula:

$$F = \frac{C_i - C_k}{C_o - C_k} \cdot 100$$

wherein: E is protective effect, %:

$C_o$—initial concentration of calcium ions in the oversaturated solution, g/l;

$C_k$—concentration of calcium ions in the solution at a given moment without the addition of the composition of the present invention, g/l;

$C_i$—concentration of calcium ions in the solution at a given moment after introduction of the composition according to the present invention, g/l.

Table 1 shows particular formulations of the composition according to the present invention and those of the known composition according to the USSR Inventor's Certificate No. 834334, as well as values of the protective effect against deposition of calcium sulphate.

As the phosphonomethylated derivative of 1,3-diaminopropanol-2 of the general formula (I) use is made of a mixture of products with a different polymerization degree, namely with n=1, n=5, n=20. The components are employed in the following proportions, percent by weight:

| | |
|---|---|
| at n = 1 | 80 |
| n = 5 | 15 |
| n = 20 | 5. |

Moreover, use is made of a mixture of 1,3-diaminopropanol-2 (n=1) and a derivative of 1,3-diaminopropanol-2 of the general formula (II) where n=5 and n=20 at the same proportions of the products in a mixture.

As the alkali metal chloride sodium chloride is used according to the present invention.

TABLE 1

| No. | Composition | Phosphonomethylated derivative of 1,3-diaminopropanol-2 | Mixture of 1,3-diaminopropanol-2 and 1,3-diaminopropanol-2 derivative | Hydrochloric acid | Sodium chloride | Water-soluble organic solvent Name | Amount | Product of reaction of benzyl chloride and hexamethylene tetramine (molar ratio 1:0.25) | Product of reaction of chlorobenzyl chloride with hexamethylene tetramine (molar ratio 1:0.35) | Product of reaction of benzylidene chloride and hexamethylene tetramine (molar ratio 1:0.45) | Water | Protective effect after 240 hours, % |
|---|---|---|---|---|---|---|---|---|---|---|---|---|
| 1 | 2 | 3 | 4 | 5 | 6 | 7 | 8 | 9 | 10 | 11 | 12 | 13 |
| 1 | Known composition (USSR Inv. Certificate No. 834334) | 5.0 | 5.0 | 3.0 | 3.0 | — | — | — | — | — | to 100 | 44.6 |
| 2 |  | 7.5 | 5.5 | 10.0 | 4.0 | — | — | — | — | — | to 100 | 56.8 |
| 3. |  | 10.0 | 6.0 | 18.0 | 5.0 | — | — | — | — | — | to 100 | 68.7 |
| 4. |  | 15.0 | 6.5 | 24.0 | 6.0 | — | — | — | — | — | to 100 | 79.9 |
| 5. |  | 20.0 | 7.0 | 30.0 | 7.0 | — | — | — | — | — | to 100 | 86.5 |
| 6. | Composition of this invention | 5.0 | 5.0 | 3.0 | 3.0 | Diacetone alcohol | 0.5 | — | — | — | to 100 | 63.8 |
| 7. |  | 10.0 | 5.0 | 10.0 | 3.7 | Diacetone alcohol | 1.0 | 0.75 | — | — | to 100 | 82.3 |
| 8. |  | 20.0 | 6.5 | 18.0 | 4.0 | Diacetone alcohol | 1.5 | 1.0 | — | — | to 100 | 92.6 |
| 9. |  | 30.0 | 6.5 | 20.0 | 4.25 |  | 2.0 | 2.5 | — | — | to 100 | 93.0 |
| 10. |  | 40.0 | 10.0 | 24.0 | 7.0 |  | 3.0 | 2.0 | — | — | to 100 | 98.0 |
| 11. |  | 50.0 | 7.0 | 30.0 | 5.0 |  | 4.0 | 1.5 | — | — | to 100 | 99.6 |
| 12. |  | 5.0 | 5.0 | 3.0 | 3.0 |  | 0.5 | — | 0.5 | — | to 100 | 60.2 |
| 13. |  | 10.0 | 5.0 | 10.0 | 3.7 |  | 1.0 | — | 0.75 | — | to 100 | 76.9 |
| 14. |  | 20.0 | 6.5 | 18.0 | 4.0 |  | 1.5 | — | 1.0 | — | to 100 | 91.8 |
| 15. |  | 30.0 | 6.0 | 20.0 | 4.25 |  | 2.0 | — | 2.5 | — | to 100 | 94.1 |
| 16. |  | 40.0 | 10.0 | 24.0 | 7.0 |  | 3.0 | — | 2.0 | — | to 100 | 96.1 |
| 17. |  | 50.0 | 7.0 | 30.0 | 5.0 |  | 4.0 | — | 1.5 | — | to 100 | 98.6 |
| 18. | Composition of this invention | 5.0 | 5.0 | 3.0 | 3.0 |  | 0.5 | — | — | 0.5 | to 100 | 63.1 |
| 19. |  | 10.0 | 5.0 | 10.0 | 3.7 |  | 1.0 | — | — | 0.75 | to 100 | 77.2 |
| 20. |  | 20.0 | 6.5 | 18.0 | 4.0 |  | 1.5 | — | — | 1.0 | to 100 | 90.6 |
| 21. |  | 30.0 | 6.0 | 20.0 | 4.25 |  | 2.0 | — | — | 2.5 | to 100 | 96.0 |
| 22. |  | 40.0 | 10.0 | 24.0 | 7.0 |  | 3.0 | — | — | 2.0 | to 100 | 96.4 |
| 23. |  | 50.0 | 7.0 | 30.0 | 5.0 |  | 4.0 | — | — | 1.5 | to 100 | 98.6 |
| 24. |  | 5.0 | 5.0 | 3.0 | 3.0 | Ethanol | 0.5 | 0.5 | — | — | to 100 | 61.8 |
| 25. |  | 10.0 | 5.0 | 10.0 | 3.7 |  | 1.0 | 0.75 | — | — | to 100 | 78.5 |
| 26. |  | 20.0 | 6.5 | 18.0 | 4.0 |  | 1.5 | 1.0 | — | — | to 100 | 90.5 |
| 27. |  | 30.0 | 6.0 | 20.0 | 4.25 |  | 2.0 | 2.5 | — | — | to 100 | 93.2 |
| 28. |  | 40.0 | 10.0 | 24.0 | 7.0 |  | 3.0 | 2.0 | — | — | to 100 | 95.4 |
| 29. |  | 50.0 | 7.0 | 30.0 | 5.0 |  | 4.0 | 1.5 | — | — | to 100 | 96.9 |
| 30. |  | 5.0 | 5.0 | 3.0 | 3.0 | Methanol | 0.5 | — | 0.5 | — | to 100 | 62.7 |
| 31. |  | 10.0 | 5.0 | 10.0 | 3.7 |  | 1.0 | — | 0.75 | — | to 100 | 75.5 |
| 32. |  | 20.0 | 6.5 | 18.0 | 4.0 |  | 1.5 | — | 1.0 | — | to 100 | 89.9 |
| 33. |  | 30.0 | 6. | 20.0 | 4.25 |  | 2.0 | — | 2.5 | — | to 100 | 92.7 |
| 34. |  | 40.0 | 10.0 | 24.0 | 7.0 |  | 3.0 | — | 2.0 | — | to 100 | 96.0 |
| 35. |  | 50.0 | 7.0 | 30.0 | 5.0 |  | 4.0 | — | 1.5 | — | to 100 | 97.4 |
| 36. |  | 5.0 | 5.0 | 3.0 | 3.0 | Methyl-ethyl ketone | 0.5 | — | — | 0.5 | to 100 | 59.5 |
| 37. |  | 10.0 | 5.0 | 10.0 | 3.7 |  | 1.0 | — | — | 0.75 | to 100 | 72.9 |
| 38. |  | 20.0 | 6.5 | 18.0 | 4.0 |  | 1.5 | — | — | 1.0 | to 100 | 90.5 |

TABLE 1-continued

| No. 1 | Composition 2 | Phosphonomethylated derivative of 1,3-diaminopropanol-2  3 | Mixture of 1,3-diaminopropanol-2 and 1,3-diaminopropanol-2 derivative  4 | Hydrochloric acid  5 | Sodium chloride  6 | Water-soluble organic solvent Name 7 | Amount 8 | Product of reaction of benzyl chloride and hexamethylene tetramine (molar ratio 1:0.25)  9 | Product of reaction of chlorobenzyl chloride with hexamethylene tetramine (molar ratio 1:0.35)  10 | Product of reaction of benzylidene chloride and hexamethylene tetramine (molar ratio 1:0.45)  11 | Water 12 | Protective effect after 240 hours, % 13 |
|---|---|---|---|---|---|---|---|---|---|---|---|---|
| 39. | Composition of this invention | 30.0 | 6.0 | 20.0 | 4.25 | | 2.0 | — | — | 2.5 | to 100 | 93.0 |
| 40. | | 40.0 | 10.0 | 24.0 | 7.0 | | 3.0 | — | — | 2.0 | to 100 | 96.1 |
| 41. | | 50.0 | 7.0 | 30.0 | 5.0 | | 4.0 | — | — | 1.5 | to 100 | 96.8 |
| 42. | | 5.0 | 5.0 | 3.0 | 3.0 | Dimethyl formamide | 0.5 | 0.5 | — | — | to 100 | 60.9 |
| 43. | | 10.0 | 5.0 | 10.0 | 3.7 | | 1.0 | 0.75 | — | — | to 100 | 76.2 |
| 44. | | 20.0 | 6.5 | 18.0 | 4.0 | | 1.5 | 1.0 | — | — | to 100 | 91.7 |
| 45. | | 30.0 | 6.0 | 20.0 | 4.25 | | 2.0 | 2.5 | — | — | to 100 | 94.8 |
| 46. | | 40.0 | 10.0 | 24.0 | 7.0 | | 3.0 | 2.0 | — | — | to 100 | 96.2 |
| 47. | | 50.0 | 7.0 | 30.0 | 5.0 | | 4.0 | 1.5 | — | — | to 100 | 96.8 |
| 48. | | 5.0 | 5.0 | 3.0 | 3.0 | Triethylamine | 0.5 | 0.5 | — | — | to 100 | 63.7 |
| 49. | | 10.0 | 5.0 | 10.0 | 3.7 | | 1.0 | 0.75 | — | — | to 100 | 78.9 |
| 50. | | 20.0 | 6.5 | 18.0 | 4.0 | | 1.5 | 1.0 | — | — | to 100 | 90.5 |
| 51. | | 30.0 | 6.0 | 20.0 | 4.25 | | 2.0 | 2.5 | — | — | to 100 | 92.0 |
| 52. | | 40.0 | 10.0 | 24.0 | 7.0 | | 3.0 | 2.0 | — | — | to 100 | 95.8 |
| 53. | | 50.0 | 7.0 | 30.0 | 5.0 | | 4.0 | 1.5 | — | — | to 100 | 96.7 |
| 54. | Comparison composition | 2.5 | 3.0 | 2.0 | 2.5 | Diacetone alcohol | 0.4 | 0.25 | — | — | to 100 | 28.3 |
| 55. | | 2.5 | 3.0 | 2.0 | 2.5 | | 0.4 | — | 0.25 | — | to 100 | 28.5 |
| 56. | | 2.5 | 3.0 | 2.0 | 2.5 | | 0.4 | — | — | 0.25 | to 100 | 29.5 |

As it follows from the data given in the above Table 1, the composition according to the present invention is superior to the known composition according to USSR Inventor's Certificate No. 834334 in the efficiency thereof. Thus, the protective effect at lower limits of concentrations of the components of the composition according to the USSR Inventor's Certificate referred to is only 44.6%, whereas that of the composition according to the present invention is 63.8%.

A similar result is observed for the protective effect at upper limits of concentrations of the components of both compositions. Thus, for the known composition the protective effect is 86.5%, for the composition according to the present invention it is equal to 99.6%.

Furthermore, data illustrating the protective effect of the composition according to the present invention against deposition of calcium sulphate are shown in Table 2 hereinbelow (the test procedure is described hereinabove). Table 2 also specifies particular formulations of the composition according to the present invention and corresponding values of the protective effect obtained. The phosphonomethylated derivative of 1,3-diaminopropanol-2 of the general formula (I) and the derivative of 1,3-diaminopropanol-2 of the general formula (II) are presented as individual compounds. As the alkali metal chloride according to the present invention sodium chloride is used.

From the data given in the above Table 2 it follows that the composition according to the present invention ensures a high protective effect against deposition of scaling of inorganic salts.

Table 3 gives particular formulations of the composition according to the present invention and corresponding values of the protective effect against deposition of calcium sulphate. As the product additionally contained in the composition according to the present invention use is made of a product of interaction of hexamethylene tetramine with different mixtures of benzylhalides. As the alkali metal chloride sodium chloride is used.

Table 4 gives particular formulations of the composition according to the present invention and corresponding values of the protective effect against the formation of scaling of calcium sulphate. As the product additionally contained in the composition according to the present invention use is made of a product of the reaction between hexamethylenetetramine with an individual benzylhalide, as the alkali metal chloride potassium chloride is used.

TABLE 2

| No. 1 | Phosphonomethylated derivative of 1,3-diaminopropanol-2 2 | 1,3-Diaminopropanol-2 and derivative of 1,3-diaminopropanol-2 3 | Hydrochloric acid 4 | Sodium chloride 5 | Water-solible organic solvent Name 6 | Amount 7 | Product of interaction of benzyl chloride and hexamethylene tetramine (molar ratio 1:0.25) 8 | Product of interaction of chlorobenzyl chloride and hexamethylenetetramine (molar ratio 1:0.35) 9 | Product of interaction of benzylidene chloride with hexamethylene tetramine (molar ratio of (1:0.45) 10 | Water 11 | Protective effect after 240 hours, % 12 |
|---|---|---|---|---|---|---|---|---|---|---|---|
| 1. | n = 1<br>20.0 | n = 1<br>6.5 | 18.0 | 4.0 | Diacetone alcohol | 1.5 | 1.0 | — | — | to 100 | 94.6 |
| 2. | 20.0 | 6.5 | 18.0 | 4.0 | Diacetone alcohol | 1.5 | — | 1.0 | — | to 100 | 95.0 |
| 3. | 20.0 | 6.5 | 18.0 | 4.0 | Diacetone alcohol | 1.5 | — | — | 1.0 | to 100 | 93.7 |
| 4. | n = 5<br>5.0 | n = 5<br>5.0 | 3.0 | 3.0 | Diacetone alcohol | 0.5 | 0.5 | — | — | to 100 | 66.7 |
| 5. | 20.0 | 6.5 | 18.0 | 4.0 | Diacetone alcohol | 1.5 | — | 1.0 | — | to 100 | 97.8 |
| 6. | 40.0 | 10.0 | 24.0 | 7.0 | Diacetone alcohol | 3.0 | — | — | 2.0 | to 100 | 99.5 |
| 7. | n = 20<br>20.0 | n = 20<br>6.5 | 18.0 | 4.0 | Diacetone alcohol | 1.5 | — | 1.0 | — | to 100 | 89.7 |
| 8. | 20.0 | 6.5 | 18.0 | 4.0 | Ethanol | 1.5 | — | 1.0 | — | to 100 | 90.0 |
| 9. | 20.0 | 6.5 | 18.0 | 4.0 | Dimethylformamide | 1.5 | — | 1.0 | — | to 100 | 90.2 |

TABLE 3

| No. 1 | Composition supply rate, mg/l 2 | Phosphonomethylated derivative of 1,3-diaminopropanol-2 3 | 1,3-diaminopropanol-2 derivative 4 | Hydrochloric acid 5 | Sodium chloride 6 | Water-soluble organic solvent Name 7 | Amount 8 | Product of interaction of benzyl chloride and hexamethylenetetramine (molar ratio 1:0.25) 9 |
|---|---|---|---|---|---|---|---|---|
| 1. | 20.0 | 5.0 | 5.0 | 3.0 | 3.0 | Diacetone alcohol | 0.5 | 0.25 |
| 2. | 20.0 | 20.0 | 6.5 | 18.0 | 4.0 | | 1.5 | — |
| 3. | 20.0 | 40.0 | 10.0 | 24.0 | 7.0 | | 3.0 | 1.0 |
| 4. | 20.0 | 5.0 | 5.0 | 3.0 | 3.0 | Ethanol | 0.5 | 0.25 |
| 5. | 20.0 | 20.0 | 6.5 | 18.0 | 4.0 | | 1.5 | 0.5 |
| 6. | 20.0 | 40.0 | 10.5 | 24.0 | 7.0 | | 3.0 | — |
| 7. | 20.0 | 5.0 | 5.0 | 3.0 | 3.0 | Dimethyl | 0.5 | 0.2 |

TABLE 3-continued

| | | | | | | | | |
|---|---|---|---|---|---|---|---|---|
| 8. | 20.0 | 20.0 | 6.5 | 18.0 | 4.0 | formamide | 1.5 | 0.25 |
| 9. | 20.0 | 40.0 | 10.0 | 24.0 | 7.0 | | 3.0 | 0.75 |

| No. 1 | Composition supply rate, mg/l 2 | Product of interaction of chlorobenzylchloride and hexamethylene tetramine (molar ratio 1:0.35) 10 | Product of interaction of benzylidene chloride with hexamethylenetetramone (molar ratio 1:0.45) 11 | Water 12 | Protective effect after 240 hours, % 13 |
|---|---|---|---|---|---|
| 1. | 20.0 | 0.25 | — | to 100 | 68.6 |
| 2. | 20.0 | 0.5 | 0.5 | to 100 | 97.7 |
| 3. | 20.0 | — | 1.0 | to 100 | 99.7 |
| 4. | 20.0 | — | 0.25 | to 100 | 68.8 |
| 5. | 20.0 | 0.5 | — | to 100 | 96.6 |
| 6. | 20.0 | 1.0 | 1.0 | to 100 | 99.3 |
| 7. | 20.0 | 0.2 | 0.1 | to 100 | 69.9 |
| 8. | 20.0 | 0.25 | 0.5 | to 100 | 97.0 |
| 9. | 20.0 | 0.75 | 0.5 | to 100 | 99.7 |

TABLE 4

| | | Components of the composition, percent by weight | | | | | |
|---|---|---|---|---|---|---|---|
| No. 1 | Composition supply rate, mg/l 2 | Phosphonomethylated derivative of 1,3-diaminopropanol-2 n = 5 3 | Derivative of 1,3-diaminopropanol-2 n = 5 4 | Hydrochloric acid 5 | Potassium chloride 6 | Water-soluble organic solvent Name 7 | Amount 8 |
| 1. | 20.0 | 5.0 | 5.0 | 3.0 | 3.0 | Diacetone alcohol | 0.5 |
| 2. | 20.0 | 20.0 | 6.5 | 18.0 | 4.0 | | 1.5 |
| 3. | 20.0 | 40.0 | 10.0 | 24.0 | 7.0 | | 3.0 |
| 4. | 20.0 | 5.0 | 5.0 | 3.0 | 3.0 | Ethanol | 0.5 |
| 5. | 20.0 | 20.0 | 6.5 | 18.0 | 4.0 | | 1.5 |
| 6. | 20.0 | 40.0 | 10.0 | 24.0 | 7.0 | | 3.0 |
| 7. | 20.0 | 5.0 | 5.0 | 3.0 | 3.0 | Methanol | 0.5 |
| 8. | 20.0 | 20.0 | 6.5 | 18.0 | 4.0 | | 1.5 |
| 9. | 20.0 | 40.0 | 10.0 | 24.0 | 7.0 | | 3.0 |
| 10. | 20.0 | 5.0 | 5.0 | 3.0 | 3.0 | Methylethyl-ketone | 0.5 |
| 11. | 20.0 | 20.0 | 6.5 | 18.0 | 4.0 | | 1.5 |
| 12. | 20.0 | 40.0 | 10.0 | 24.0 | 7.0 | | 3.0 |
| 13. | 20.0 | 5.0 | 5.0 | 3.0 | 3.0 | Dimethyl-formamide | 0.5 |
| 14. | 20.0 | 20.0 | 6.5 | 18.0 | 4.0 | | 1.5 |
| 15. | 20.0 | 40.0 | 10.0 | 24.0 | 7.0 | | 3.0 |
| 16. | 20.0 | 5.0 | 5.0 | 3.0 | 3.0 | Triethyl-amine | 0.5 |
| 17. | 20.0 | 20.0 | 6.5 | 18.0 | 4.0 | | 1.5 |
| 18. | 20.0 | 40.0 | 10.0 | 24.0 | 7.0 | | 3.0 |

| No. 1 | Composition supply rate, mg/l 2 | Product of reaction of benzyl chloride and hexamethylenetetramine (molar ratio 1:0.25) 9 | Product of reaction of chlorobenzyl chloride and hexamethylene tetramine (molar ratio 1:0.35) 10 | Product of reaction of benzylidene chloride and hexamethylenetetramine (molar ratio 1:0.45) 11 | Water 12 | Protective effect after 240 hours, % 13 |
|---|---|---|---|---|---|---|
| 1. | 20.0 | 0.5 | — | — | to 100 | 64.3 |
| 2. | 20.0 | — | 1.0 | — | to 100 | 93.0 |
| 3. | 20.0 | — | — | 2.0 | to 100 | 98.3 |
| 4. | 20.0 | — | 0.5 | — | to 100 | 63.1 |
| 5. | 20.0 | — | — | 1.0 | to 100 | 90.4 |
| 6. | 20.0 | 2.0 | — | — | to 100 | 96.0 |
| 7. | 20.0 | — | — | 0.5 | to 100 | 63.0 |
| 8. | 20.0 | 1.0 | — | — | to 100 | 90.1 |
| 9. | 20.0 | — | 2.0 | — | to 100 | 96.4 |
| 10. | 20.0 | — | 0.5 | — | to 100 | 59.9 |
| 11. | 20.0 | — | 1.0 | — | to 100 | 91.2 |
| 12. | 20.0 | — | 2.0 | — | to 100 | 96.9 |
| 13. | 20.0 | 0.5 | — | — | to 100 | 61.4 |
| 14. | 20.0 | 1.0 | — | — | to 100 | 92.0 |
| 15. | 20.0 | 2.0 | — | — | to 100 | 97.3 |
| 16. | 20.0 | — | — | 0.5 | to 100 | 64.4 |
| 17. | 20.0 | — | — | 1.0 | to 100 | 91.3 |
| 18. | 20.0 | — | — | 2.0 | to 100 | 96.0 |

The evaluation of the protective effect of the composition according to the present invention and that of the USSR Inventor's Certificate No. 834334 against deposition of calcium carbonate scaling was effected according to the following procedure.

Oversaturated solutions of calcium carbonate are prepared by mixing equivalent amounts of sodium carbonate and calcium chloride.

The reaction proceeds according to the scheme:

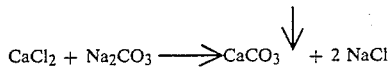

$$CaCl_2 + Na_2CO_3 \longrightarrow CaCO_3 \downarrow + 2\,NaCl$$

The initial concentration of calcium carbonate in the oversaturated solution is 7.0 g/l. All the experiments are conducted at the temperature of 40±1° C. under stirring at the speed of 500 r.p.m. The supply rate of the composition is 20.0 mg per liter of the oversaturated solution.

Assessment of the protective effect was carried out 240 hours afterwards by sampling and analysis of the sample for calcium ions. The protective effect value was calculated by the formula given hereinabove.

Table 5 gives particular formulations of the composition according to the present invention and corresponding values of the protective effect against deposition of calcium carbonate.

As the phosphonomethylated derivative of 1,3-diaminopropanol-2 of the general formula (I) a mixture of products with a different degree of polymerization, namely n=1, n=5 and n=20 is used. These products are employed in the following proportions, percent by weight:

| at n = 1 | 80 |
|---|---|
| n = 5 | 15 |
| n = 20 | 5. |

Moreover, use is made of a mixture of 1,3-diaminopropanol-2 (n=1) and the derivative of 1,3-diaminopropanol-2 of the general formula (II) where n=5 and 20 at the same proportions of the products in a mixture.

As the alkali metal chloride sodium chloride is used.

For the purpose of comparison, Table 5 also shows the assessment of the protection effect against deposition of calcium carbonate scaling obtained from the prior art composition according to the USSR Inventor's Certificate No. 834334.

TABLE 5

| No. 1 | Composition 2 | Phosphonomethylated derivative of 1,3-diaminopropanol-2  3 | Mixture of 1,3-diaminopropanol-2 derivative of 1,3-diaminopropanol-2 acid  4 | Hydrochloric acid 5 | Sodium chloride 6 | Water-soluble organic solvent Name 7 | Amount 8 |
|---|---|---|---|---|---|---|---|
| 1. | Known composition | 5.0 | 5.0 | 3.0 | 3.00 | — | — |
| 2. | (USSR Inventor's | 7.5 | 5.5 | 10.0 | 4.0 | — | — |
| 3. | Certificate | 10.0 | 6.0 | 18.0 | 5.0 | — | — |
| 4. | No. 834434) | 15.0 | 6.5 | 24.0 | 6.0 | — | — |
| 5. | | 20.0 | 7.0 | 30.0 | 7.0 | — | — |
| 6. | Composition of | 5.0 | 5.0 | 3.00 | 3.0 | Diacetone | 0.5 |
| 7. | this invention | 20.0 | 6.5 | 18.0 | 4.0 | alcohol | 1.5 |
| 8. | | 40.0 | 10.0 | 24.0 | 7.0 | | 3.0 |
| 9. | | 50.0 | 7.0 | 30.0 | 5.0 | | 4.0 |
| 10. | | 5.0 | 5.0 | 3.0 | 3.0 | Ethanol | 0.5 |
| 11 | | 20.0 | 6.5 | 18.0 | 4.0 | | 1.5 |
| 12. | | 40.0 | 10.0 | 24.0 | 7.0 | | 3.0 |
| 13. | | 50.0 | 7.0 | 30.0 | 5.0 | | 4.0 |
| 14. | | 5.0 | 5.0 | 3.0 | 3.0 | Methanol | 0.5 |
| 15. | | 20.0 | 6.5 | 18.0 | 4.0 | | 1.5 |
| 16. | | 40.0 | 10.0 | 24.0 | 7.0 | | 3.0 |
| 17. | | 50.0 | 7.0 | 30.0 | 5.0 | | 4.0 |
| 18. | | 5.0 | 5.0 | 3.0 | 3.0 | Methylethyl- | 0.5 |
| 19. | | 20.0 | 6.5 | 18.0 | 4.0 | ketone | 1.5 |
| 20. | | 40.0 | 10.0 | 24.0 | 7.0 | | 3.0 |
| 21. | | 50.0 | 7.0 | 30.0 | 5.0 | | 4.0 |
| 22 | | 5.0 | 5.0 | 3.0 | 3.0 | Dimethyl- | 0.5 |
| 23 | | 20.0 | 6.5 | 18.0 | 4.0 | formamide | 1.5 |
| 24. | | 40.0 | 10.0 | 24.0 | 7.0 | | 3.0 |
| 25. | | 50.0 | 7.0 | 30.0 | 5.0 | | 4.0 |
| 26. | | 5.0 | 5.0 | 3.0 | 3.0 | Triethylamine | 0.5 |
| 27. | | 20.0 | 6.5 | 18.0 | 4.0 | | 1.5 |
| 28. | | 40.0 | 10.0 | 24.0 | 7.0 | | 3.0 |
| 29. | | 50.0 | 7.0 | 30.0 | 5.0 | | 4.0 |
| 30. | Comparison | 2.5 | 3.0 | 2.0 | 2.5 | Diacetone | 0.4 |
| 31. | composition | 2.5 | 3.0 | 2.0 | 2.5 | alcohol | 0.4 |
| 32. | | 2.5 | 3.0 | 2.0 | 2.5 | | 0.4 |

| No. 1 | Composition 2 | Product of reaction of benzyl chloride and hexamethylenetetramine (molar ratio 1:0.25)  9 | Product of reaction of chlorobenzyl chloride and hexamethylene tetramine (molar ratio 1:0.35)  10 | Product of reaction of benzylidene chloride and hexamethylene tetramine (molar ratio 1:0.45)  11 | Water 12 | Protective effect after 240 hours. % 13 |
|---|---|---|---|---|---|---|
| 1. | Known composition | — | — | — | to 100 | 52.3 |
| 2. | (USSR Inventor's | — | — | — | to 100 | 61.6 |
| 3. | Certificate | — | — | — | to 100 | 70.4 |
| 4. | No. 834434 | — | — | — | to 100 | 89.2 |
| 5. | | — | — | — | to 100 | 43.2 |
| 6. | | 0.5 | — | — | to 100 | 66.2 |
| 7. | | 1.0 | — | — | to 100 | 90.3 |
| 8. | this invention | 2.0 | — | — | to 100 | 95.8 |
| 9. | | 1.5 | — | — | to 100 | 99.8 |
| 10. | | — | 0.5 | — | to 100 | 66.8 |

TABLE 5-continued

| | | | | | | |
|---|---|---|---|---|---|---|
| 11. | | — | 1.0 | — | to 100 | 91.2 |
| 12. | | — | 2.0 | — | to 100 | 94.8 |
| 13. | | — | 1.5 | — | to 100 | 99.9 |
| 14. | | — | — | 0.5 | to 100 | 65.7 |
| 15. | | — | — | 1.0 | to 100 | 90.7 |
| 16. | | — | — | 2.0 | to 100 | 95.0 |
| 17. | | — | — | 1.5 | to 100 | 100 |
| 18. | | 0.5 | — | — | to 100 | 63.8 |
| 19. | | 1.0 | — | — | to 100 | 91.3 |
| 20. | | 2.0 | — | — | to 100 | 96.4 |
| 21. | | 1.5 | — | — | to 100 | 100 |
| 22. | | — | 0.5 | — | to 100 | 62.8 |
| 23. | | — | 1.0 | — | to 100 | 90.3 |
| 24. | | — | 2.0 | — | to 100 | 94.4 |
| 25. | | — | 1.5 | — | to 100 | 100 |
| 26. | | — | — | 0.5 | to 100 | 63.0 |
| 27. | | — | — | 1.0 | to 100 | 90.2 |
| 28. | | — | — | 2.0 | to 100 | 95.0 |
| 29. | | — | — | 1.5 | to 100 | 100 |
| 30. | Comparison | 0.25 | — | — | to 100 | 38.9 |
| 31. | composition | — | 0.25 | — | to 100 | 40.0 |
| 32. | | — | — | 0.25 | to 100 | 40.0 |

The comparative evaluation of the data given in Table 5 allows a conclusion that the composition according to the present invention is substantially superior, in the efficiency thereof, over the prior art composition according to the USSR Inventor's Certificate No. 834334 upon inhibition of calcium carbonate scaling. Thus, the protective effect ensured by the composition according to the present invention at lower limits of concentrations is 63.7%, whereas that of the prior art composition is only 52.3%.

A similar result is obtained for upper limits of concentrations of the components of both compositions. Thus, the protective effect of the prior art composition is 93.0%, whereas for the composition according to the present invention it is equal to 100%.

What is claimed is:

1. A composition for preventing deposition of inorganic salts comprising:

a phosphonomethylated derivative of 1,3-diaminopropanol-2 of the general formula:

$$(HO)_2PO-CH_2-N+CH_2-CH-CH_2-N \overline{\smash{)_n}}\,CH_2-PO(OH)_2, \quad (I)$$
$$\underset{PO(OH)_2}{\overset{|}{CH_2}} \quad \underset{}{\overset{|}{OH}} \quad \underset{PO(OH)_2}{\overset{|}{CH_2}}$$

wherein
n = 1 to 20,
amines selected from the group consisting of 1,3-diaminopropanol-2, a derivative of 1,3-diaminopropanol-2 of the general formula:

$$H_2N+CH_2-CH-CH_2-NH\overline{\smash{)_n}}\,H, \quad (II)$$
$$\underset{OH}{\overset{|}{}}$$

wherein
n = 2 to 20,
and a mixture of said amines;
hydrochloric acid;
an alkali metal chloride;
a product of interaction of a chlorinated aromatic compound selected from the group consisting of benzyl chloride, chlorobenzyl chloride, benzylidene chloride and mixtures of said compounds with hexamethylene tetramine, the molar ratio between said chlorinated aromatic compound and hexamethylenetetramine being equal to 1:0.25–0.45 respectively;
a water-soluble organic solvent;
water;
said components being present in the following proportions, percent by weight:

| | |
|---|---|
| phosphonomethylated derivative of 1,3-diaminopropanol-2 of the general formula (I) | 5.0–50.0 |
| amines selected from the group consisting of 1,3-diaminopropanol-2, derivative of 1,3-diaminopropanol-2 of the general formula (II) | 5.0–10.0 |
| hydrochloric acid | 3.0–30.0 |
| alkali metal chloride | 3.0–7.0 |
| product of interaction of a chlorinated aromatic compound with hexamethylene tetramine | 0.5–2.5 |
| water-soluble organic solvent | 0.5–4.0 |
| water | to 100%. |

* * * * *